(12) United States Patent
Tanaka et al.

(10) Patent No.: US 7,817,911 B2
(45) Date of Patent: Oct. 19, 2010

(54) PHOTOGRAPHIC METHOD AND APPARATUS

(75) Inventors: Seiji Tanaka, Kurokawa-gun (JP);
Kenkichi Hayashi, Kurokawa-gun (JP)

(73) Assignee: FUJIFILM Corporation, Tokyo (JP)

( * ) Notice: Subject to any disclaimer, the term of this patent is extended or adjusted under 35 U.S.C. 154(b) by 184 days.

(21) Appl. No.: 12/252,147

(22) Filed: Oct. 15, 2008

(65) Prior Publication Data
US 2009/0097836 A1    Apr. 16, 2009

(30) Foreign Application Priority Data
Oct. 16, 2007    (JP)    ............................ 2007-269015

(51) Int. Cl.
*G03B 13/00*    (2006.01)
*G03B 15/02*    (2006.01)

(52) U.S. Cl. ...................... 396/103; 196/180

(58) Field of Classification Search ............. 396/76–77, 396/106, 180, 89, 103, 125, 133
See application file for complete search history.

(56) References Cited

U.S. PATENT DOCUMENTS

| | | | |
|---|---|---|---|
| 5,305,049 A | 4/1994 | Miyazaki et al. | |
| 5,539,495 A * | 7/1996 | Katoh et al. | 396/48 |
| 5,737,643 A * | 4/1998 | Kitagawa et al. | 396/55 |
| 5,883,703 A * | 3/1999 | Knirck et al. | 355/55 |
| 7,711,253 B2 * | 5/2010 | Tomita et al. | 396/53 |
| 2002/0164161 A1 * | 11/2002 | Yamaguchi et al. | 396/61 |
| 2007/0188652 A1 * | 8/2007 | Yuyama | 348/372 |

FOREIGN PATENT DOCUMENTS

| | | |
|---|---|---|
| JP | 61-006317 A | 1/1986 |
| JP | 63-318531 A | 12/1988 |
| JP | 4-212134 A | 8/1992 |
| JP | 5-005923 A | 1/1993 |
| JP | 5-210038 A | 8/1993 |

* cited by examiner

*Primary Examiner*—W. B. Perkey
*Assistant Examiner*—Dennis Hancock
(74) *Attorney, Agent, or Firm*—Sughrue Mion, PLLC

(57) ABSTRACT

A photographic method for slow synchro-flash photography conducted by firing a flash at a slow shutter speed, comprising the steps of:
   starting exposure with a focusing lens placed at an arbitrary position, and
   moving the focusing lens to such a position as to focus on a main subject, just before the flash is fired.

8 Claims, 6 Drawing Sheets

PHOTOGRAPHIC METHOD AND APPARATUS

BACKGROUND OF THE INVENTION

1. Field of the Invention

The present invention relates to a photographic method and apparatus, and more particularly, to a photographic method and apparatus which produce special photographic effects by slow synchro-flash photography.

2. Description of the Related Art

Many compact cameras have a built-in flash in a camera body and are configured such that the flash is fired automatically when photography is taken in the dark.

For flash photography, shutter speed is normally fixed at approximately 1/60 second to prevent camera shake and subject movement. If a flash photograph of a person is taken against a night scene at such a shutter speed, although the person is photographed appropriately, the night scene which the flash light does not reach appears totally dark in the photograph. Thus, to photograph a subject against a night scene or the like, slow synchro-flash photography is used which involves taking a photograph by firing a flash at a slow shutter speed of 1/15 second or longer (e.g., Japanese Patent Application Laid-Open No. 5-210038). Since the background which the flash light does not reach is exposed sufficiently, the slow synchro-flash photography provides an image re-creating an atmosphere which exists when the photograph is taken.

Flash photography is normally taken at a fixed zoom level, and known methods for producing special photographic effects include a method for taking flash photography by zooming at the time of exposure (zoom burst) (Japanese Patent Application Laid-Open Nos. 5-5923 and 63-318531). The zoom burst provides an image in which there are streaks toward the center.

SUMMARY OF THE INVENTION

However, with slow synchro-flash photography, limits are placed on available f-stop numbers and shutter speeds, making it difficult for a photographer to obtain an intended image. Also, zoom burst, which produces a special photographic effect, is limited in subjects and photography scenes.

The present invention has been made in view of the above circumstances, and an object of the present invention is to provide a photographic method and apparatus which allow a photographer to easily obtain an intended image in slow synchro-flash photography.

To achieve the above object, according to a first aspect of the present invention, there is provided a photographic method for slow synchro-flash photography conducted by firing a flash at a slow shutter speed, comprising the steps of: starting exposure with a focusing lens placed at an arbitrary position, and moving the focusing lens to such a position as to focus on a main subject, just before the flash is fired.

According to the first aspect of the present invention, slow synchro-flash photography is conducted by starting exposure with the focusing lens placed at an arbitrary position and moving the focusing lens to an in-focus position just before the flash is fired. This makes it possible to take a photograph by changing the degree of blur of a background as desired.

To achieve the above object, according to a second aspect of the present invention, there is provided a photographic method for slow synchro-flash photography conducted by firing a flash at a slow shutter speed, comprising the steps of: starting exposure with a focusing lens placed at such a position as to front-focus on a main subject, and moving the focusing lens to such a position as to focus on the main subject, just before the flash is fired.

According to the second aspect of the present invention, slow synchro-flash photography is conducted by starting exposure with the focusing lens placed at such a position as to front-focus on the main subject and moving the focusing lens to the in-focus position just before the flash is fired. This makes it possible to photograph an image with a blurred background.

To achieve the above object, according to a third aspect of the present invention, there is provided a photographic method for slow synchro-flash photography conducted by firing a flash at a slow shutter speed, starting exposure with a focusing lens placed at such a position as to focus on a background, and moving the focusing lens to such a position as to focus on a main subject, just before the flash is fired.

According to the third aspect of the present invention, slow synchro-flash photography is conducted by starting exposure with the focusing lens placed at such a position as to focus on the background and moving the focusing lens to the position where the focusing lens will focus on the main subject, just before the flash is fired. This makes it possible to photograph an image with both the background and main subject placed in focus.

To achieve the above object, according to a fourth aspect of the present invention, in the photographic method according the third aspect, an amount of camera shake is detected and only when the detected amount of camera shake is less than a threshold, exposure is started with the focusing lens placed at the position where the focusing lens will focus on a background.

According to the fourth aspect of the present invention, in the photographic method according the third aspect, exposure is started with the focusing lens placed at the position where the focusing lens will focus on the background only when the detected amount of camera shake is less than a threshold. This makes it possible to avoid an unsuccessful photo with a blurred background. Incidentally, when the amount of camera shake is equal to or larger than the threshold, the focusing lens may be placed at such a position as to focus on the main subject or any other position at the start of exposure.

To achieve the above object, according to a fifth aspect of the present invention, there is provided a photographic apparatus which, being equipped with a taking lens including a focusing lens, a flash for use to emit flash light to a main subject, and an image pickup device for use to pick up an optical image of subjects formed on a light-receiving surface via the taking lens, conducts slow synchro-flash photography by firing the flash at a slow shutter speed, the photographic apparatus comprising: a lens moving device which moves the focusing lens; a detection device which detects a position where the focusing lens will focus on the main subject; an acquisition device which acquires information about a flash timing to fire the flash; and a control device which controls movement of the focusing lens based on detection results produced by the detection device and the information acquired by the acquisition device, during slow synchro-flash photography, wherein the control device moves the focusing lens to a predetermined position before start of exposure and moves the focusing lens to the position where the focusing lens will focus on the main subject, just before the flash is fired.

According to the fifth aspect of the present invention, as in the case of the first aspect, it is possible to take a photograph by changing the degree of blur of a background as desired.

To achieve the above object, according to a sixth aspect of the present invention, there is provided a photographic apparatus which, being equipped with a taking lens including a focusing lens, a flash for use to emit flash light to a main subject, and an image pickup device for use to pick up an optical image of subjects formed on a light-receiving surface via the taking lens, conducts slow synchro-flash photography by firing the flash at a slow shutter speed, the photographic apparatus comprising: a lens moving device which moves the focusing lens; a detection device which detects a position where the focusing lens will focus on the main subject; an arithmetic device which calculates a position where the focusing lens will front-focus on the main subject, based on detection results produced by the detection device; an acquisition device which acquires information about a flash timing to fire the flash; and a control device which controls movement of the focusing lens based on detection results produced by the detection device, computational results produced by the arithmetic device, and the information acquired by the acquisition device, during slow synchro-flash photography, wherein the control device moves the focusing lens to the position where the focusing lens will front-focus on the main subject before start of exposure and moves the focusing lens to the position where the focusing lens will focus on the main subject, just before the flash is fired.

According to the sixth aspect of the present invention, as in the case of the second aspect, it is possible to photograph an image with a blurred background.

To achieve the above object, according to a seventh aspect of the present invention, there is provided a photographic apparatus which, being equipped with a taking lens including a focusing lens, a flash for use to emit flash light to a main subject, and an image pickup device for use to pick up an optical image of subjects formed on a light-receiving surface via the taking lens, conducts slow synchro-flash photography by firing the flash at a slow shutter speed, the photographic apparatus comprising: a lens moving device which moves the focusing lens; a detection device which detects a position where the focusing lens will focus on the main subject and a position where the focusing lens will focus on a background; an acquisition device which acquires information about a flash timing to fire the flash; and a control device which controls movement of the focusing lens based on detection results produced by the detection device and the information acquired by the acquisition device, during slow synchro-flash photography, wherein the control device moves the focusing lens to the position where the focusing lens will focus on the background before start of exposure and moves the focusing lens to the position where the focusing lens will focus on the main subject, just before the flash is fired.

According to the seventh aspect of the present invention, as in the case of the third aspect, it is possible to photograph an image with both the background and main subject placed in focus.

To achieve the above object, according to the eighth aspect of the present invention, the photographic apparatus according to the seventh aspect further comprising an amount-of-camera-shake detection device which detects an amount of camera shake, wherein only when the detected amount of camera shake by the amount-of-camera-shake detection device is less than a threshold, the control device moves the focusing lens to the position where the focusing lens will focus on the background before start of exposure.

According to the eighth aspect of the present invention, as in the case of the fourth aspect, it is possible to avoid an unsuccessful photo with a blurred background.

The present invention allows a photographer to easily photograph an intended image in slow synchro-flash photography.

DETAILED DESCRIPTION OF THE PREFERRED EMBODIMENTS

The best mode for implementing a photographic method and apparatus according to the present invention will be described below with reference to the drawings.

Figure 1:
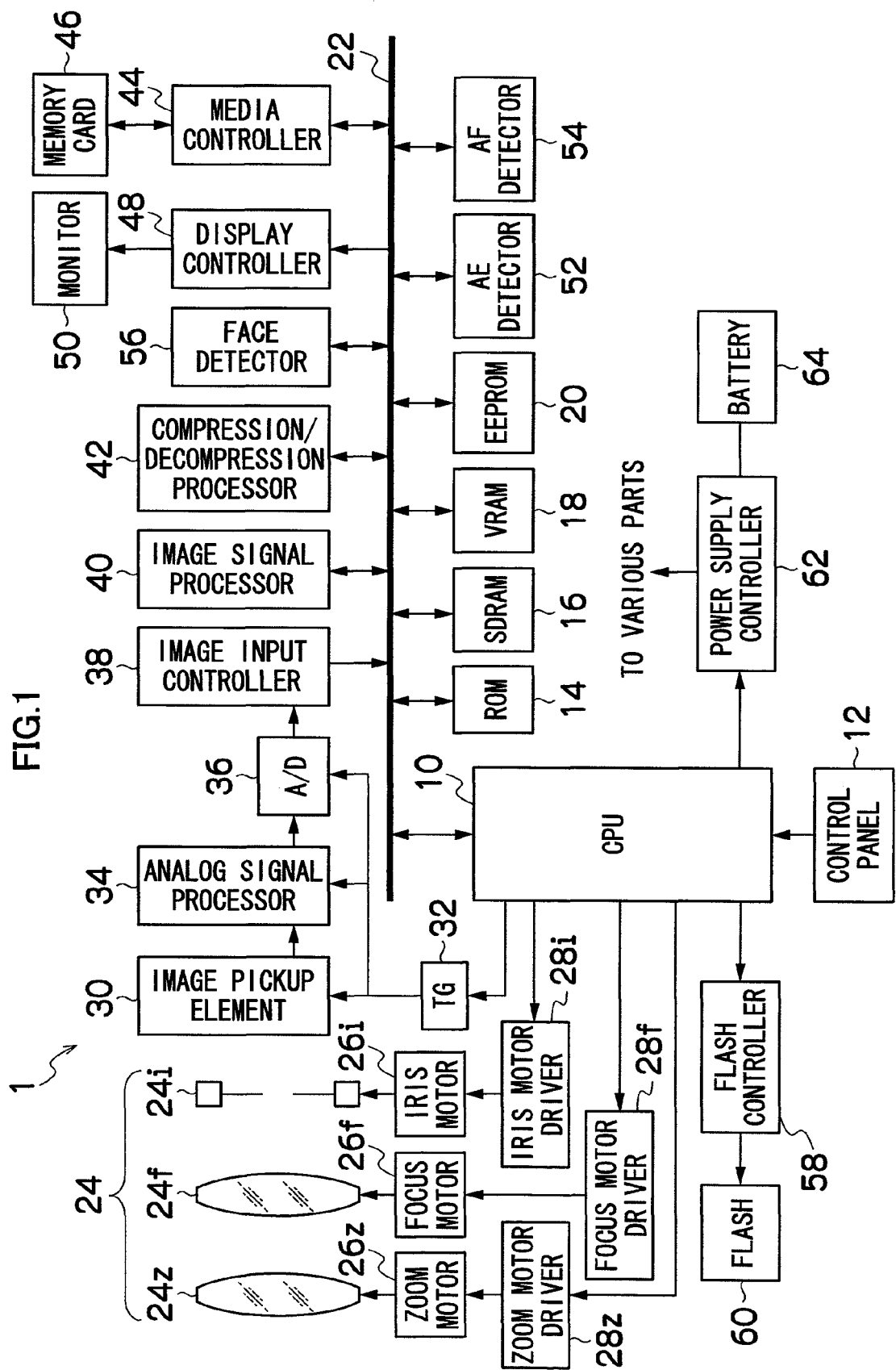
FIG. 1 is a block diagram showing a configuration of an embodiment of a photographic apparatus according to the present invention.

FIG. 1 is a block diagram showing a configuration of an embodiment of a photographic apparatus 1 according to the present invention.

As shown in FIG. 1, the photographic apparatus 1, which is a digital camera that records images electronically, includes a CPU 10, control panel 12, ROM 14, SDRAM 16, VRAM 18, EEPROM 20, photographic optical system 24, image pickup element 30, timing generator 32, analog signal processor 34, A/D converter 36, image input controller 38, image signal processor 40, compression/decompression processor 42, media controller 44, memory card 46, display controller 48, monitor 50, AE detector 52, AF detector 54, face detector 56, flash controller 58, flash 60, power supply controller 62, battery 64, and the like.

The CPU 10 functions as a control device which integrally controls operation of the entire photographic apparatus. Based on input from the control panel 12, the CPU 10 controls various parts of the photographic apparatus 1 according to a predetermined program. Also, functioning as an arithmetic processing device which calculates various control values needed to control the photographic apparatus 1, the CPU 10 performs various arithmetic processes according to a predetermined program. Various parts of the photographic apparatus 1 are connected to the CPU 10 via a bus 22.

The ROM 14 stores the programs executed by the CPU 10 and various data needed for control. The RAM 16 is used as a working area for the CPU 10 and as a temporary storage area of image data. The VRAM 18 is used exclusively as a temporary storage area of image data for display. The EEPROM 20 stores various configuration information and the like unique to a user.

The control panel 12 contains various controls including power button, shutter-release button, zoom button, mode selector switch, menu button, cross keypad, run button, and cancel button and outputs a signal to the CPU 10 in response to manipulation of the controls.

The shutter-release button is a two-step push button which lends itself to so-called half press and full press. When the shutter-release button is half-pressed, the photographic apparatus 1 performs preparatory processes for photography such as AE and AF and when the shutter-release button is full-pressed, the photographic apparatus 1 performs a process for actual photography.

Various settings of the photographic apparatus 1 are made using a display on the monitor 50. That is, when the menu button is pressed, a settings screen is displayed on the monitor 50, allowing the user to make various settings of the photographic apparatus 1. Following a screen display on the monitor 50, the user makes various settings of the photographic apparatus 1 using the cross keypad, run button, and/or cancel button.

In addition to a photography function to photograph images, the photographic apparatus 1 has a playback function used to play back the photographed images. The mode selector switch is used to switch between the photography and playback modes.

The photographic optical system 24 includes an AF zoom lens which is made up of a zoom lens 24z for zooming, focusing lens 24f for focusing, and iris 24i for light intensity adjustment.

The zoom lens 24z moves back and forth along an optical axis, being driven by a zoom motor 26z. Consequently, a subject image formed on a light-receiving surface of the image pickup element 30 is scaled up and down. The CPU 10 controls operation of the zoom motor 26z via a zoom motor driver 28z, thereby controls movement of the zoom lens 24z, and thereby controls zooming.

The focusing lens 24f moves back and forth along an optical axis, being driven by a focus motor 26f. Consequently, focus is adjusted. The CPU 10 controls operation of the focus motor 26f via a focus motor driver 28f, thereby controls movement of the focusing lens 24f, and thereby adjusts focus.

The iris 24i, which is provided, for example, in the form of an iris diaphragm, changes its opening (f-stop number), being driven by an iris motor 26i. The CPU 10 controls operation of the iris motor 26i via an iris motor driver 28i, thereby controls the opening of the iris 24i, and thereby controls quantity of subject light incident on the light-receiving surface of the image pickup element 30.

The image pickup element 30, which is a color CCD with a predetermined RGB color filter array, operates by being driven by a timing generator (TG) 32. That is, based on drive pulses provided from the timing generator 32, the image pickup element 30 reads a signal charge accumulated in each pixel (photosensor) and outputs an image signal. The CPU 10 controls operation of the timing generator 32, and thereby controls charging time (shutter speed) of the image pickup element 30 and reading of the image signal.

The analog signal processor 34 produces an output by amplifying the analog image signal outputted from the image pickup element 30 using correlated double sampling.

The A/D converter 36 produces an output by converting the analog image signal outputted from the analog signal processor 34 into a digital image signal.

The image input controller 38, which incorporates a line buffer of a predetermined capacity, captures an image signal for one frame outputted from the A/D converter 36 and stores the frame in the RAM 16 under the control of the CPU 10.

The image signal processor 40 captures the image signal from the RAM 16, performs necessary signal processing, and thereby generates an image signal (Y/C signal) from a luminance signal (Y) and color-difference signals (Cr, Cb) under the control of the CPU 10.

The compression/decompression processor 42 captures the image signal (Y/C signal), performs a predetermined compression process, and thereby generates a compressed image data (e.g., JPEG) under the control of the CPU 10.

Also, the compression/decompression processor 42 captures compressed image data, performs a predetermined decompression process, and thereby generates an uncompressed image signal (Y/C signal) under the control of the CPU 10.

The media controller 44 reads and writes data from/to the memory card 46 under the control of the CPU 10. For example, based on instructions for recording given by the CPU 10, the media controller 44 records the image data obtained by photography on the memory card 46. Also, based on instructions for reading given by the CPU 10, the media controller 44 reads appropriate data out of the memory card 46. The memory card 46 is removably inserted in a card slot.

The display controller 48 controls the display on the monitor 50 under the control of the CPU 10. Specifically, the display controller 48 reads the image signal (Y/C signal) out of the VRAM 18, converts it into a signal format for display, and outputs it to the monitor 50. In so doing, the display controller 48 superimposes the image signal with information such as characters, graphics, and symbols.

The monitor 50 is, for example, a color LCD. In playback mode, the monitor 50 is used as a playback display for photographed images. In photography mode, the monitor 50 is used as an electronic viewfinder which provides live view of the images captured by the image pickup element 30.

The AE detector 52 captures R, G, and B image signals from the RAM 16 and calculates integrated values needed for AE control under the control of the CPU 10. With the photographic apparatus 1 according to the present embodiment, a single screen is divided into multiple areas (e.g., 8×8) and the integrated value of the image signal is calculated in each of the areas. Based on the integrated values obtained from the AE detector 52, the CPU 10 finds brightness of a photography scene and determines the f-stop number and shutter speed (e.g., using a program chart) during AE control.

The AF detector 54 captures the R, G, and B image signals from the RAM 16 and calculates a focus score needed for AF control under the control of the CPU 10. The AF detector 54 includes a high pass filter which passes only a high-frequency component of the G signal, an absolute value generator, focus area extractor which extracts a signal in a predetermined focus area in the screen, and an integrator which integrates absolute value data in the focus area. The AF detector 54 outputs, as a focus score, the absolute value data integrated in the focus area by the integrator to the CPU 10. During AF control, by adjusting the focusing lens 24f from minimum focus distance to infinity, the CPU 10 acquires the focus score in small steps and detects a peak position of the focus score. Then, by designating the detected peak position as an in-focus position (position of the focusing lens 24f focused on the main subject), the CPU 10 moves the focusing lens 24f to that position.

The face detector 56 captures the image signal (Y/C signal) and a facial region of a person from the image obtained by photography under the control of the CPU 10. Techniques for extracting a face from an image are publicly known, and thus concrete description thereof will be omitted. Typical examples include a method which uses pattern matching with face templates; a method which extracts flesh-color data from an original image and then extracts a cluster of metering points determined to fall within a flesh-color range as a face; a method which converts metering data into hue and saturation, creates a two-dimensional histogram using the obtained hue and saturation, analyzes the histogram, and thereby determines a facial region; a method which extracts a facial candidate region similar to a shape of a human face and determines a facial region based on feature values of the candidate region; and a method which determines a facial region by extracting a profile of a human face from an image. The photographic apparatus 1 according to the present embodiment detects a face using one of the face detection techniques.

The flash controller 58 controls firing of the flash 60 under the control of the CPU 10. The flash controller 58 fires the flash using flash timing and flash light quantity specified by the CPU 10.

The flash 60 is made up, for example, of a xenon tube. Alternatively, the flash 60 may be made up of an LED.

The power supply controller 62 controls power supply from the battery 64 installed in the apparatus body to various parts of the photographic apparatus 1 based on instructions from the CPU 10.

Operation of the photographic apparatus 1 according to the present embodiment with the above configuration will be described next.

Basic processes and operations of the photographic apparatus 1 according to the present embodiment for photography and playback will be described first.

When the user turns on the photographic apparatus 1 and put it in the photography mode using the control panel 12, the photographic apparatus 1 becomes ready to photograph images.

Upon entering the photography mode, the photographic apparatus 1 displays live view on the monitor 50. Specifically, images are picked up continuously by the image pickup element 30, a Y/C signal is generated continuously from the resulting image signal, and the generated Y/C signal is supplied in sequence to the display controller 48 via the VRAM 18 and outputted to the monitor 50. Consequently, the images captured by the image pickup element 30 are displayed as live view on the monitor 50.

Also, faces are extracted at the same time. The Y/C signal generated from the image signal captured for use as live view is supplied to the face detector 56 and human faces in the images are extracted. When a human face is detected by the face detector 56, a face detection frame is superimposed over the live view and the detected human face is surrounded by the detection frame. Incidentally, the face detection function can be turned on and off as desired.

The photographer decides a composition by watching the live view displayed on the monitor 50 and half-presses the shutter-release button.

When the shutter-release button is half-pressed, an S1 ON signal is inputted in the CPU 10. In response to the S1 ON signal, the CPU 10 performs preparatory processes for photography, i.e., AE and AF processes.

First, an image signal outputted from the image pickup element 30 is captured into the RAM 16 via the analog signal processor 34, A/D converter 36, and image input controller 38 and supplied to the AE detector 52 and AF detector 54.

The AE detector 52 calculates integrated values needed for AE control from the inputted image signal and outputs the integrated values to the CPU 10. Based on the integrated values obtained from the AE detector 52, the CPU 10 finds the brightness of the photography scene and determines the f-stop number and shutter speed for actual photography.

Also, the AF detector 54 calculates the focus score in a predetermined focus area based on the inputted image signal and outputs the calculated focus score to the CPU 10. Based on the output from the AF detector 54, the CPU 10 detects the in-focus position (position of the focusing lens focused on the main subject) and moves the focusing lens 24f to that position.

If the face detection function is ON, a focus area is set up so as to enclose the detected face and the detected human face is brought into focus. If the face detection function is OFF, focus is adjusted based on a user-set focus area.

The photographer checks focusing condition and the like by watching the live view displayed on the monitor 50. When a desired subject is in focus, the photographer full-presses the shutter-release button to give a command to take an actual photograph.

When the shutter-release button is full-pressed, an S2 ON signal is inputted in the CPU 10. In response to the S2 ON signal, the CPU 10 performs processes for actual photography and records a resulting image.

First, the CPU 10 exposes the image pickup element 30 using the f-stop number and shutter speed determined in the AE process and thereby picks up the image for recording.

An image signal for one frame outputted from the image pickup element 30 is captured into the image input controller 38 via the analog signal processor 34 and A/D converter 36 and stored in the RAM 16. The image signal stored in the RAM 16 is supplied to the image signal processor 40, which then generates an image signal (Y/C signal).

The Y/C signal generated by the image signal processor 40 is stored in the RAM 16 once, and then supplied to the compression/decompression processor 42, subjected to a predetermined compression process, and stored in the RAM 16 again. The CPU 10 generates an image file in a predetermined format (e.g., Exif) by adding predetermined supplementary information (shooting conditions including the f-stop number, shutter speed, and sensitivity; the shooting date/time; and other photography-related information) to the compressed image data stored in the RAM 16. Then, the generated image file is stored in the memory card 46.

Incidentally, although in this example, the image data obtained by photography is stored in a compressed form, the compression process is not strictly necessary and the image data may be stored in an uncompressed form if the user so chooses. Alternatively, the image data may be stored as so-called RAW data if the user so chooses.

The image thus recorded on the memory card 46 can be played back on the monitor 50 when the photographic apparatus 1 is set to playback mode. Now processes for playback will be described below.

When the user sets the photographic apparatus 1 to playback mode via the control panel 12, the CPU 10 reads image data in the last image file recorded on the memory card 46, via the media controller 44.

The image data read out of the memory card 46 is supplied to the compression/decompression processor 42, outputted therefrom as uncompressed image data, and supplied to the VRAM 18. Then, the image data is outputted to the monitor 50 from the VRAM 18 via the display controller 48. Consequently, an image recorded on the memory card 46 is played back on the monitor 50.

For frame advance of images, right and left keys of the cross keypad on the control panel 12 are used, for example. Specifically, when the right key of the cross keypad is pressed, compressed image data in the next image file is read out of the memory card 46 and played back on the monitor 50. On the other hand, when the left key of the cross keypad is pressed, compressed image data in the previous image file is read out of the memory card 46 and played back on the monitor 50.

In this way, the images recorded on the memory card 46 are played back.

Next, description will be given of procedures for slow synchro-flash photography which is a feature of the present invention.

First Embodiment

According to the present embodiment, in slow synchro-flash photography, the focusing lens 24f is moved to a lens position set arbitrarily by the user (user-set position) and exposure is started at this position. Just before the flash 60 is fired, the focusing lens 24f is moved to the in-focus position. When the focusing lens 24f reaches the in-focus position, the flash 60 is fired and the exposure is completed.

To conduct slow synchro-flash photography, the user sets the photographic apparatus 1 to a special photographic mode (slow synchro-flash photography mode) using a settings screen brought up on the monitor 50 at the press of the menu button.

Figure 2:
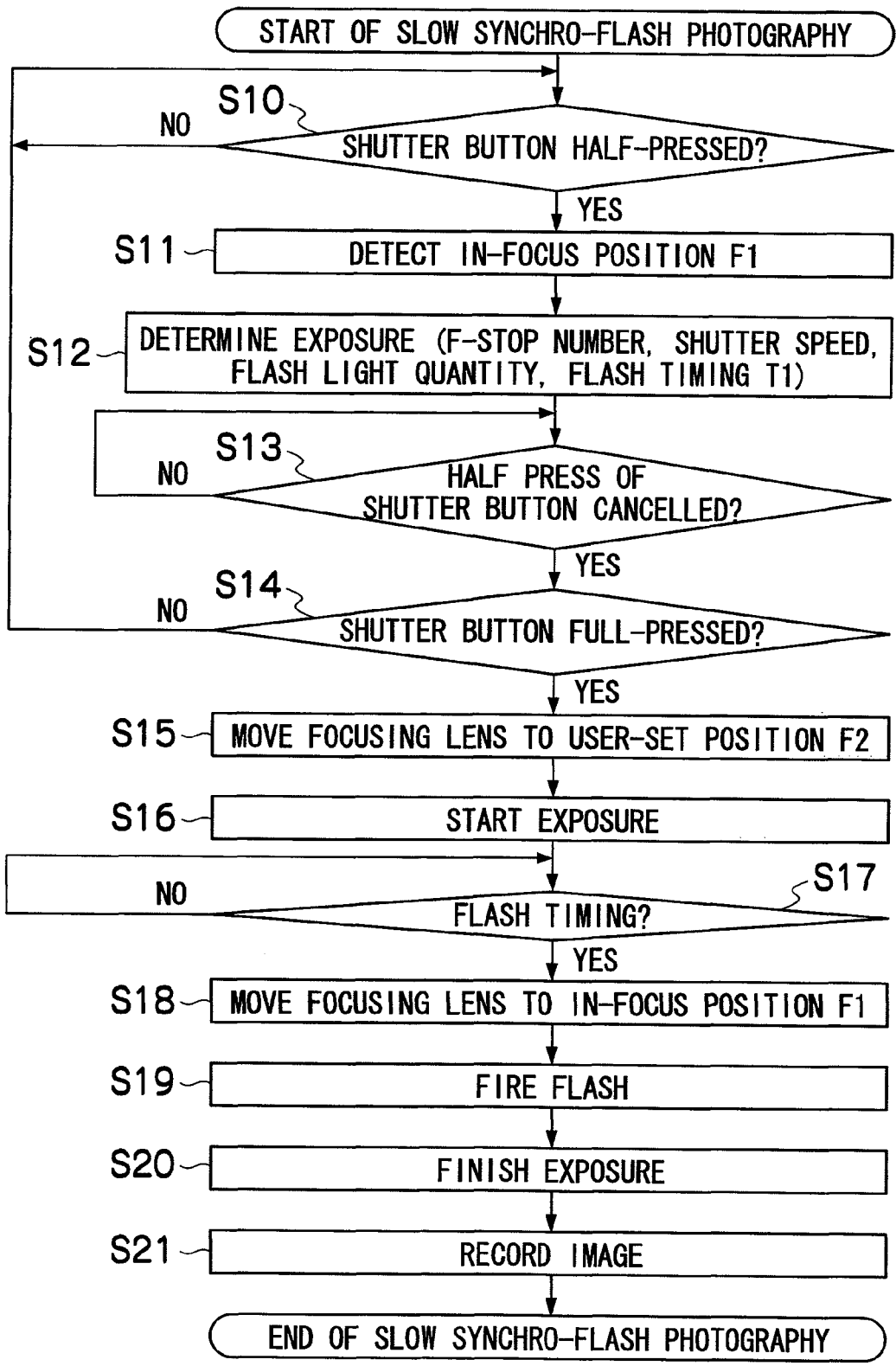
FIG. 2 is a flowchart showing procedures for slow synchro-flash photography (first embodiment)

FIG. 2 is a flowchart showing procedures for slow synchro-flash photography on the photographic apparatus 1 according to the present embodiment.

First, the CPU 10 determines whether the shutter button is half-pressed (Step S10). When the shutter button is half-pressed, the CPU 10 performs preparatory processes for photography. Specifically, by adjusting the focusing lens 24f from minimum focus distance to infinity, the CPU 10 acquires the focus score in small steps in a predetermined focus area and detects a peak position (in-focus position) F1 of the focus score (Step S11). If a face detection process is used, it is desirable to set the focus area automatically in a detected face position. The CPU 10 stores resulting information about the in-focus position F1 in the SDRAM 16.

Also, based on image data obtained from the image pickup element 30, the CPU 10 finds the brightness of the photography scene and determines the exposure for actual photography (Step S12). Since this is slow synchro-flash photography, the CPU 10 determines the light quantity and flash timing (the time T1 from the start of exposure to firing) of the flash 60 as well as the f-stop number and shutter speed. The CPU 10 stores resulting information about exposure settings in the SDRAM 16.

The light quantity of the flash 60 is determined, for example, by preflashing of the flash 60. Specifically, the CPU 10 fires the flash 60 in a predetermined light quantity, measures the brightness of the photography scene at that time, and calculates the light quantity of the flash 60 required for actual photography based on resulting information about the brightness of the photography scene. Alternatively, the CPU 10 may measure distance to a main subject and then calculates the light quantity of the flash 60 required for actual photography based on resulting distance information, guide number information about the flash 60, and information about photographic sensitivity.

The flash timing (T1) of the flash 60 is set such that the flash 60 will fire just before the exposure is finished (so-called rear curtain sync).

When the preparation for photography is completed, the CPU 10 determines, based on input from the control panel 12, whether the half press of the shutter button is cancelled (Step S13). If it is determined that the half press of the shutter button is cancelled, the CPU 10 determines, based on input from the control panel 12, whether the shutter button is full-pressed (Step S14). If it is determined that the shutter button is not full-pressed, the CPU 10 returns to Step S10 to determine again whether the shutter button is half-pressed.

On the other hand, if it is determined that the shutter button is full-pressed, the CPU 10 moves the focusing lens 24f to a user-set position F2 (Step S15). The user-set position F2 can be set by the user as desired, for example, to the closest end or the position at which the focusing lens is located when the shutter button is half-pressed (in that case, since the focusing lens 24f returns to its original position (where the focusing lens 24f was located when the shutter button was full-pressed) after a search for in-focus position, there is no need to move the focusing lens 24f). The user establishes the user-set position F2 in advance (e.g., by using the settings screen brought up on the monitor 50 at the press of the menu button). The information about the established user-set position F2 is stored in the EEPROM 20. The CPU 10 moves the focusing lens 24f to the user-set position F2 based on the information stored in the EEPROM 20.

Once the focusing lens 24f is moved to the user-set position F2, the CPU 10 starts exposing the image pickup element 30 (Step S16). The CPU 10 counts elapsed time from the start of exposure and determines whether the flash timing T1 of the flash 60 has come (Step S17).

If it is determined that the flash timing T1 of the flash 60 has come, the CPU 10 moves the focusing lens 24f to the in-focus position F1 (Step S18). When the movement of the focusing lens 24f is completed, the CPU 10 fires the flash 60 (Step S19).

Subsequently, the CPU 10 finishes the exposure when a preset exposure time (shutter speed) is reached (Step S20), records the image obtained by photography on the memory card 46 (Step S21), and finishes the process.

In this way, in slow synchro-flash photography, the photographic apparatus 1 according to the present embodiment moves the focusing lens 24f to the user-set position F2 established arbitrarily by the user and starts exposure thereat. Then, just before the flash 60 is fired, the focusing lens 24f is moved to the in-focus position F1. When the focusing lens 24f reaches the in-focus position F1, the flash 60 is fired. This makes it possible to take a photograph by blurring the background as desired. That is, when it is desired to take a photograph with a higher degree of background blur, the user-set position F2 is established in such a way that focus will be achieved in front of the main subject (so called front-focus position) and when it is desired to take a photograph with the background brought into focus as well, the user-set position F2 is moved to such a position that the background will be in focus.

In this way, the photographic apparatus 1 according to the present embodiment makes it possible to take a desirable photograph easily by changing the degree of blur of the background.

Second Embodiment

A second embodiment of a photographic method for slow synchro-flash photography will be described next.

Whereas the photographic method according to the first embodiment allows the user to set the position of the focusing lens (user-set position) arbitrarily at the start of exposure, according to the second embodiment, the focusing lens is automatically placed at such a position as to front-focus on the main subject, at the start of exposure.

Since equipment configuration itself is the same as the photographic apparatus 1 according to the first embodiment, only procedures for slow synchro-flash photography will be described here.

Figure 3:
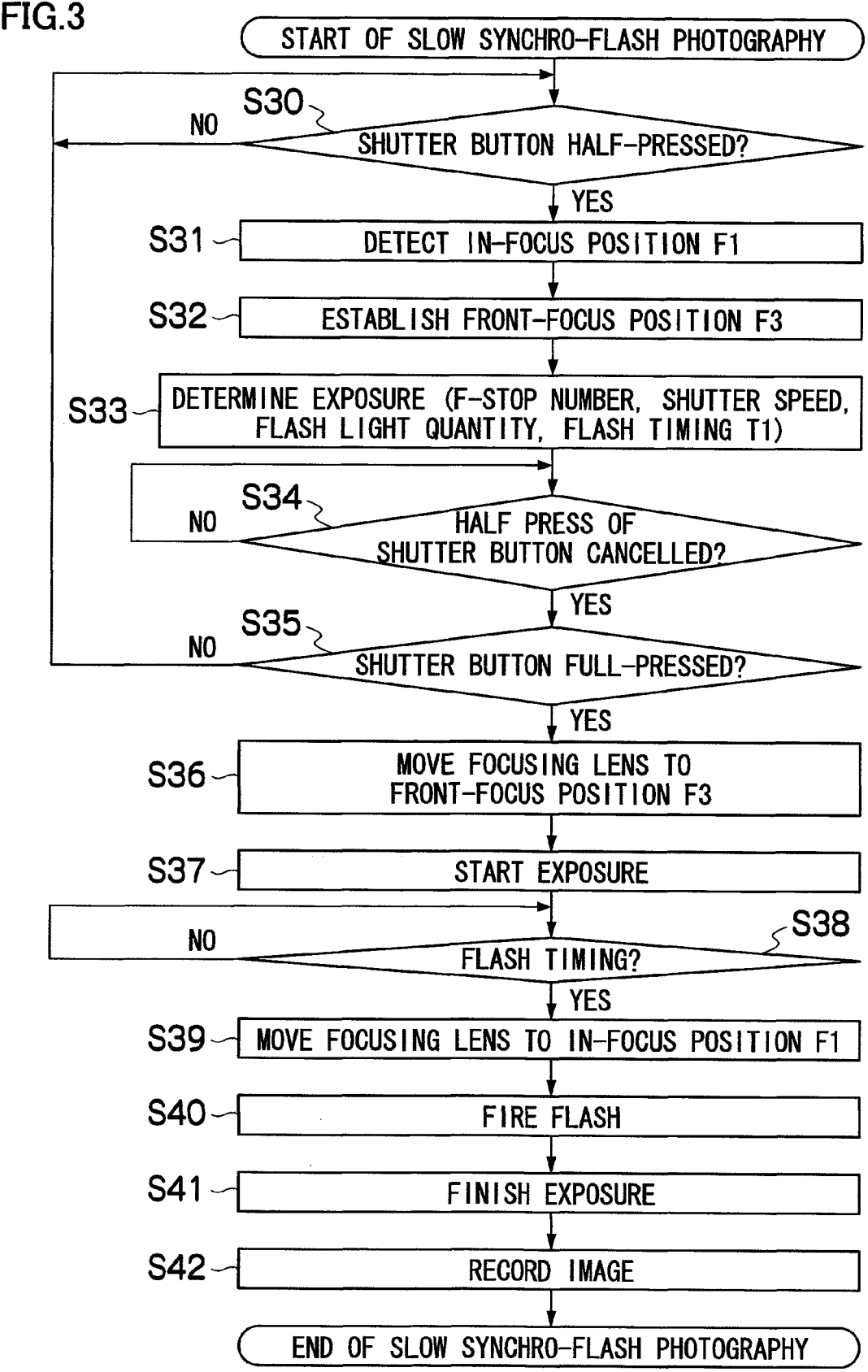
FIG. 3 is a flowchart showing procedures for slow synchro-flash photography (second embodiment)

FIG. 3 is a flowchart showing procedures for slow synchro-flash photography.

First, the CPU 10 determines whether the shutter button is half-pressed (Step S30). When the shutter button is half-pressed, the CPU 10 performs preparatory processes for photography. Specifically, by adjusting the focusing lens 24*f* from minimum focus distance to infinity, the CPU 10 acquires the focus score in small steps in a predetermined focus area and detects a peak position (in-focus position) F1 of the focus score (Step S31). If a face detection process is used, it is desirable to set the focus area automatically in a detected face position. The CPU 10 stores resulting information about the in-focus position F1 in the SDRAM 16.

Also, based on the resulting information about the in-focus position F1, the CPU 10 calculates a position at which the focusing lens 24*f* will front-focus on the main subject and establishes a front-focus position F3 (Step S32). The front-focus position F3 is set in front of the in-focus position F1 by a predetermined distance d. The distance d may be a fixed value set at the factory or may be freely user configurable. If the front-focus position F3 calculated here is closer than the closest end, the front-focus position F3 is set to the closest end without variation. The CPU 10 stores resulting information about the front-focus position F3 in the SDRAM 16.

Also, based on image data obtained from the image pickup element 30, the CPU 10 finds the brightness of the photography scene and determines the exposure for actual photography (Step S33). Since this is slow synchro-flash photography, the CPU 10 determines the light quantity and flash timing (the time T1 from the start of exposure to firing) of the flash 60 as well as the f-stop number and shutter speed. The CPU 10 stores resulting information about exposure settings in the SDRAM 16.

When the preparation for photography is completed, the CPU 10 determines, based on input from the control panel 12, whether the half press of the shutter button is cancelled (Step S34). If it is determined that the half press of the shutter button is cancelled, the CPU 10 determines, based on input from the control panel 12, whether the shutter button is full-pressed (Step S35). If it is determined that the shutter button is not full-pressed, the CPU 10 returns to Step S30 to determine again whether the shutter button is half-pressed.

On the other hand, if it is determined that the shutter button is full-pressed, the CPU 10 moves the focusing lens 24*f* to the front-focus position F3 (Step S36). Once the focusing lens 24*f* is moved to the front-focus position F3, the CPU 10 starts exposing the image pickup element 30 (Step S37). The CPU 10 counts elapsed time from the start of exposure and determines whether the flash timing T1 of the flash 60 has come (Step S38).

If it is determined that the flash timing T1 of the flash 60 has come, the CPU 10 moves the focusing lens 24*f* to the in-focus position F1 (Step S39). When the movement of the focusing lens 24*f* is completed, the CPU 10 fires the flash 60 (Step S40).

Subsequently, the CPU 10 finishes the exposure when a preset exposure time (shutter speed) is reached (Step S41), records the image obtained by photography on the memory card 46 (Step S42), and finishes the process.

In this way, according to the present embodiment, exposure is started with the focusing lens 24*f* placed at the front-focus position F3. Then, just before the flash 60 is fired, the focusing lens 24*f* is moved to the in-focus position F1. This makes it possible to create a blurred background without going through troublesome settings and thereby obtain an image which has a fantastic atmosphere.

Third Embodiment

A third embodiment of a photographic method for slow synchro-flash photography will be described next.

According to the present embodiment, at the start of exposure, the focusing lens is placed automatically at such a position as to focus on a background.

Since equipment configuration itself is the same as the photographic apparatus 1 according to the first embodiment, only procedures for slow synchro-flash photography will be described here.

Figure 4:
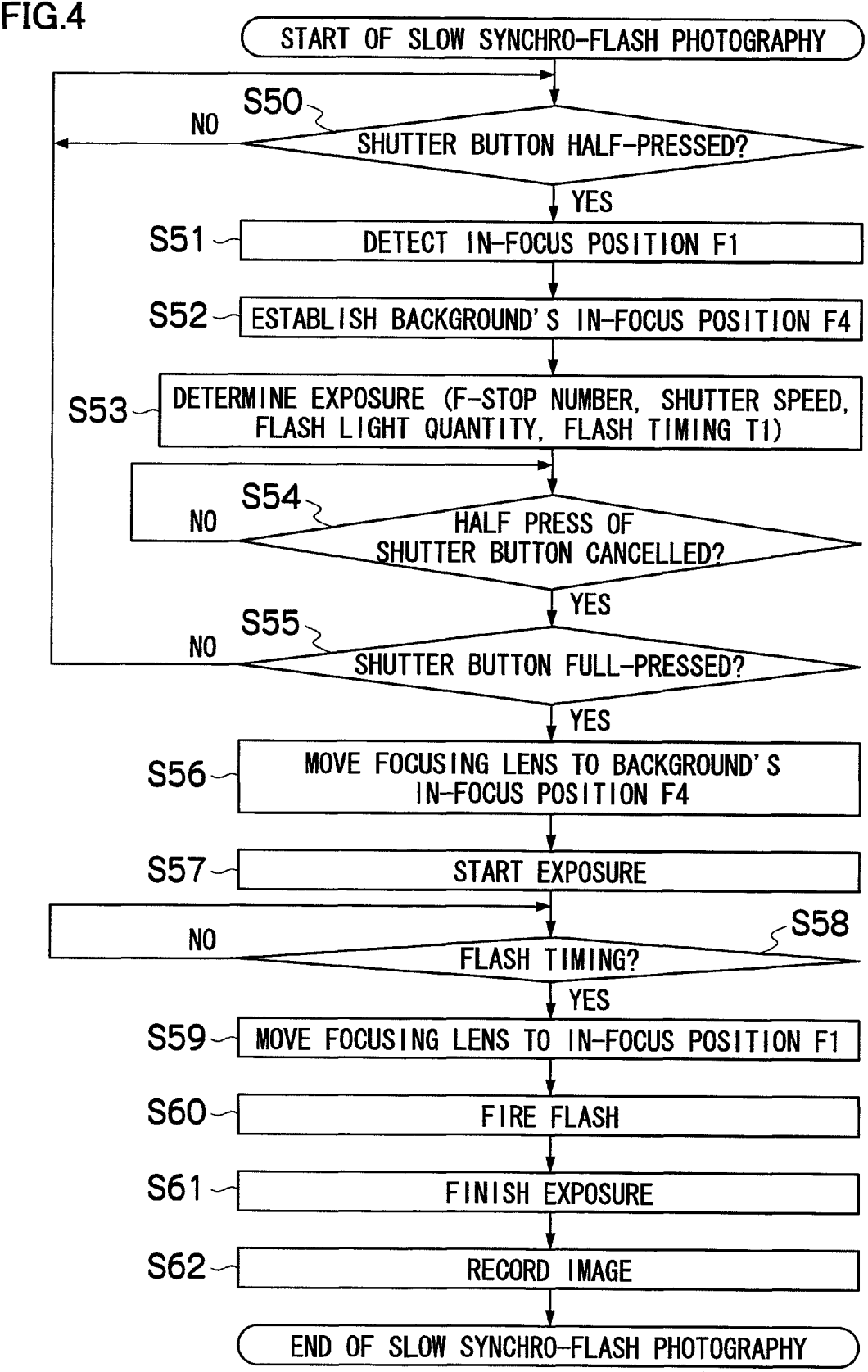
FIG. 4 is a flowchart showing procedures for slow synchro-flash photography (third embodiment)

FIG. 4 is a flowchart showing procedures for slow synchro-flash photography.

First, the CPU 10 determines whether the shutter button is half-pressed (Step S50). When the shutter button is half-pressed, the CPU 10 performs preparatory processes for photography. Specifically, by adjusting the focusing lens 24*f* from minimum focus distance to infinity, the CPU 10 acquires the focus score in small steps in a predetermined main focus area and detects a peak position (in-focus position) F1 of the focus score (Step S51). Also, the CPU 10 acquires the focus score in small steps in a predetermined background focus area and detects a peak position (background's in-focus position) F4 of the focus score (Step S52).

The main focus area is established, for example, in the center of a screen to focus on a main subject. On the other hand, the background focus area is established beside the main focus area (e.g., a predetermined distance to the right or left of the main focus area). The current main focus area is displayed as a frame (focusing frame) on the monitor 50, being superimposed over live view. The photographer fits the main subject in the focusing frame and half-presses the shutter-release button.

Incidentally, the main focus area and background focus area may be designed to be freely user configurable. For example, the screen may be divided into multiple areas, allowing the user to select desired areas as the main focus area and background focus area.

Alternatively, the user may be allowed to establish only the main focus area with the background focus area established automatically beside the main focus area.

Alternatively, during face detection, the main focus area may be established over a detected face (when a plurality of face candidates are detected, the most likely face with the highest probability score) and the background focus area may be established automatically beside the main focus area. Preferably, the background focus area is established automatically by avoiding the detected face.

The CPU 10 stores information about the in-focus position F1 and background's in-focus position F4 thus obtained in the SDRAM 16.

Also, based on image data obtained from the image pickup element 30, the CPU 10 finds the brightness of the photography scene and determines the exposure for actual photography (Step S53). Since this is slow synchro-flash photography, the CPU 10 determines the light quantity and flash timing (the time T1 from the start of exposure to firing) of the flash 60 as well as the f-stop number and shutter speed. The CPU 10 stores resulting information about exposure settings in the SDRAM 16.

When the preparation for photography is completed, the CPU 10 determines, based on input from the control panel 12, whether the half press of the shutter button is cancelled (Step S54). If it is determined that the half press of the shutter button is cancelled the CPU 10 determines, based on input from the control panel 12, whether the shutter button is full-pressed (Step S55). If it is determined that the shutter button is not full-pressed, the CPU 10 returns to Step S50 to determine again whether the shutter button is half-pressed.

On the other hand, if it is determined that the shutter button is full-pressed, the CPU 10 moves the focusing lens 24*f* to the background's in-focus position F4 (Step S56). Once the focusing lens 24f is moved to the background's in-focus position F4, the CPU 10 starts exposing the image pickup element 30 (Step S57). The CPU 10 counts elapsed time from the start of exposure and determines whether the flash timing T1 of the flash 60 has come (Step S58).

If it is determined that the flash timing T1 of the flash 60 has come, the CPU 10 moves the focusing lens 24f to the in-focus position F1 (Step S59). When the movement of the focusing lens 24f is completed, the CPU 10 fires the flash 60 (Step S60).

Subsequently, the CPU 10 finishes the exposure when a preset exposure time (shutter speed) is reached (Step S61), records the image obtained by photography on the memory card 46 (Step S62), and finishes the process.

In this way, according to the present embodiment, exposure is started with the focusing lens 24f placed at the background's in-focus position F4 to focus on the background. Then, just before the flash 60 is fired, the focusing lens 24f is moved to the in-focus position F1 to focus on the main subject. This makes it possible to photograph an image with both the background and main subject placed in focus.

Incidentally, according to the present embodiment, to detect the background's in-focus position, a background focus area is established and a position at which the focus score peaks in the background focus area is detected as the background's in-focus position. However, methods for detecting the background's in-focus position is not limited to this. For example, when the focus score is acquired in small steps from minimum focus distance to infinity in the main focus area, the focus score has two peaks: at a position where the main subject is in focus and at a position where the background is in focus. Thus, it is possible to detect the background focus area, even if not set up specifically, by detecting the position at which the focus score peaks on the infinity side.

Fourth Embodiment

A fourth embodiment of a photographic method for slow synchro-flash photography will be described next.

According to the third embodiment, in slow synchro-flash photography, exposure is started with the focusing lens placed at the background's in-focus position so as to take an image with both background and main subject placed in focus and the focusing lens 24f is moved to the in-focus position just before the flash is fired. However, when the focusing lens is located at the background's in-focus position during exposure, camera shake could result in an unnatural image with a blurred background.

Thus, according to the present embodiment, camera shake is detected before actual photography. Exposure is started with the focusing lens placed at the background's in-focus position only when an amount of detected camera shake is less than a threshold. When the amount of detected camera shake is equal to or larger than the threshold, exposure is started with the focusing lens placed at the in-focus position from the beginning.

Figure 5:
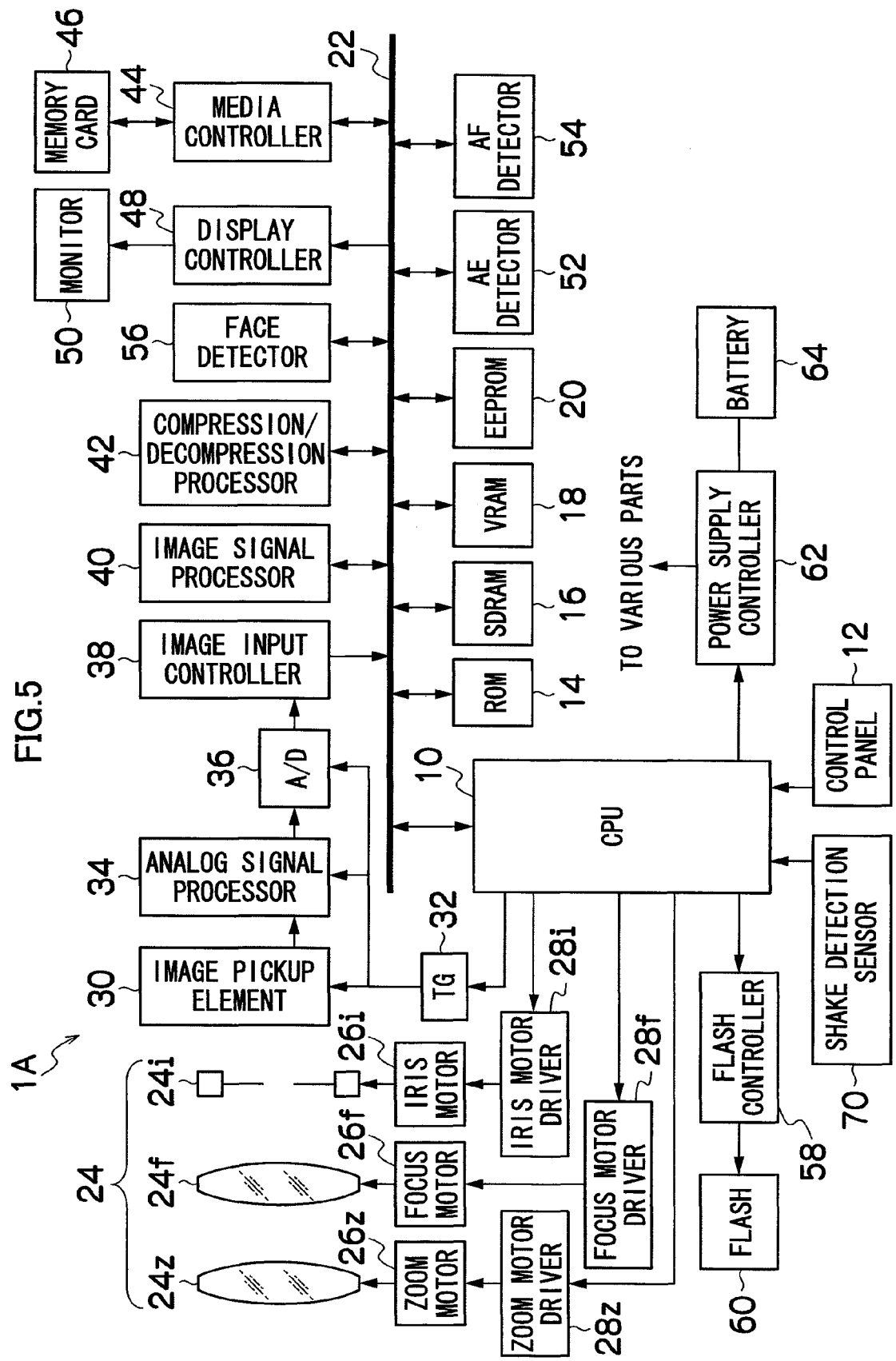
FIG. 5 is a block diagram showing a configuration of an embodiment of a photographic apparatus according to the present invention (fourth embodiment)

FIG. 5 is a block diagram showing a configuration of a photographic apparatus 1A according to the present embodiment. The photographic apparatus 1A differs from the photographic apparatus 1 shown in FIG. 1 in having a shake detection sensor 70. The other components, which are the same as those of the photographic apparatus 1 shown in FIG. 1, are denoted by the same reference numerals as the corresponding components, and description thereof will be omitted.

The shake detection sensor 70 is, for example, a gyro sensor. The CPU 10 detects the amount of camera shake of the apparatus body based on output from the gyro sensor.

Alternatively, the shake detection sensor 70 may be an acceleration sensor which detects movements of the apparatus body in an up-and-down direction (Y direction) and right-and-left direction (X direction) or an angular velocity sensor which detects yawing and pitching of the camera.

The CPU 10 compares the amount of camera shake detected by the shake detection sensor 70 with the threshold. When the amount of camera shake is less than the threshold, the CPU 10 starts exposure with the focusing lens placed at the background's in-focus position only. On the other hand, when the amount of camera shake is equal to or larger than the threshold, the CPU 10 starts exposure with the focusing lens placed at the in-focus position. The threshold is set in advance and stored in the ROM 14.

Figure 6:
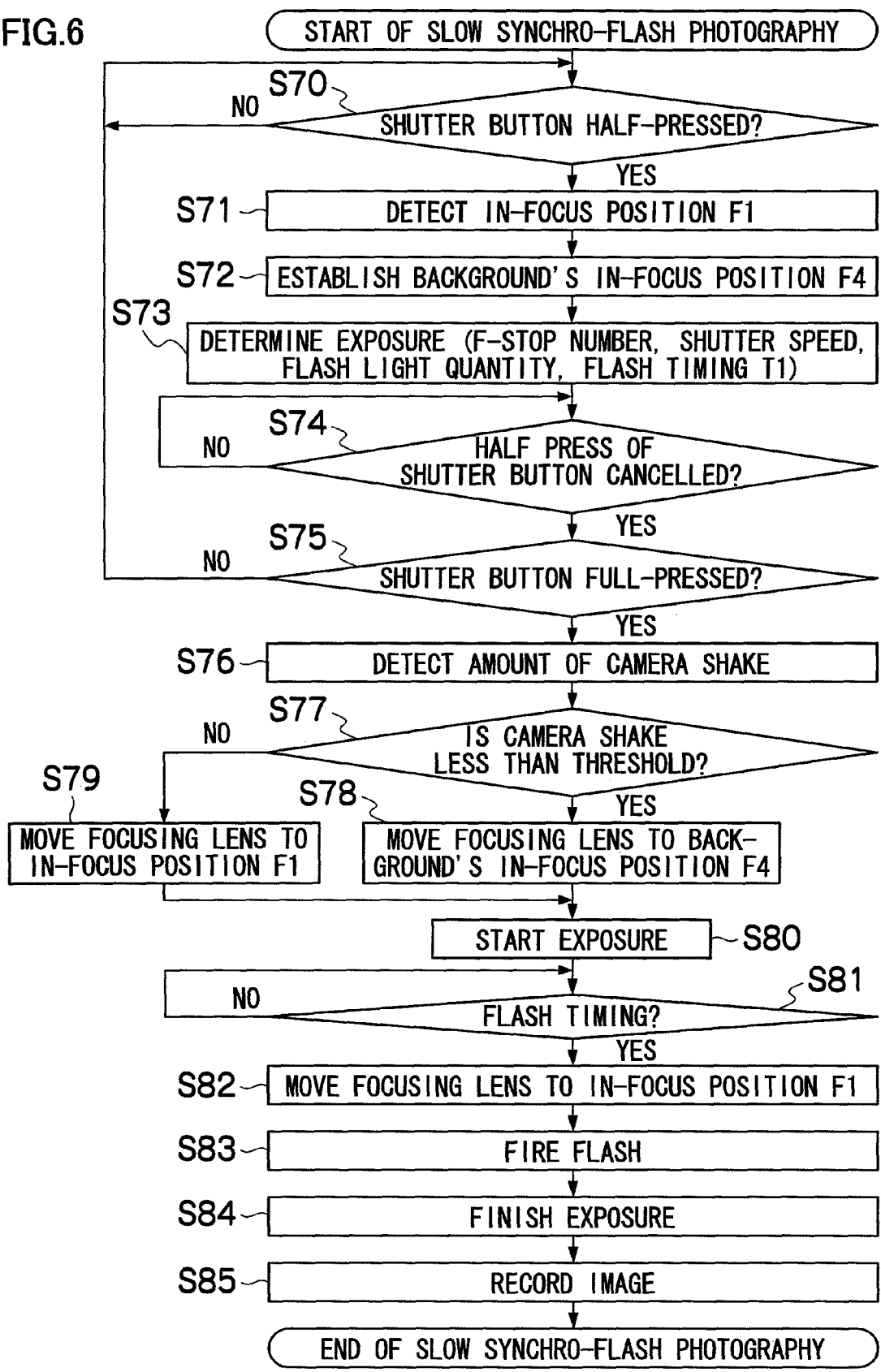
FIG. 6 is a flowchart showing procedures for slow synchro-flash photography (fourth embodiment).

FIG. 6 is a flowchart showing procedures for slow synchro-flash photography.

First, the CPU 10 determines whether the shutter button is half-pressed (Step S70). When the shutter button is half-pressed, the CPU 10 performs preparatory processes for photography. Specifically, by adjusting the focusing lens 24f from minimum focus distance to infinity, the CPU 10 acquires the focus score in small steps in a predetermined main focus area and detects a peak position (in-focus position) F1 of the focus score (Step S71). Also, the CPU 10 acquires the focus score in small steps in a predetermined background focus area and detects a peak position (background's in-focus position) F4 of the focus score (Step S72). The CPU 10 stores resulting information about the in-focus position F1 and background's in-focus position F4 in the SDRAM 16.

Also, based on image data obtained from the image pickup element 30, the CPU 10 finds the brightness of the photography scene and determines the exposure for actual photography (Step S73). Since this is slow synchro-flash photography, the CPU 10 determines the light quantity and flash timing (the time T1 from the start of exposure to firing) of the flash 60 as well as the f-stop number and shutter speed. The CPU 10 stores resulting information about exposure settings in the SDRAM 16.

When the preparation for photography is completed, the CPU 10 determines, based on input from the control panel 12, whether the half press of the shutter button is cancelled (Step S74). If it is determined that the half press of the shutter button is cancelled, the CPU 10 determines, based on input from the control panel 12, whether the shutter button is full-pressed (Step S75). If it is determined that the shutter button is not full-pressed, the CPU 10 returns to Step S70 to determine again whether the shutter button is half-pressed.

On the other hand, if it is determined that the shutter button is full-pressed, the CPU 10 detects the amount of camera shake of the apparatus body using the shake detection sensor 70 (Step S76). Then, by comparing the detected amount of camera shake with the threshold, the CPU 10 determines whether the detected amount of camera shake is less than the threshold (Step S77).

If it is determined that the detected amount of camera shake is less than the threshold, the CPU 10 moves the focusing lens 24f to the background's in-focus position F4 (Step S78). On the other hand, if it is determined that the detected amount of camera shake is equal to or larger than the threshold, the CPU 10 moves the focusing lens 24f to the in-focus position F1 (Step S79).

After moving the focusing lens 24f to a predetermined position according to the amount of camera shake in this way, the CPU 10 starts exposing the image pickup element 30

(Step S80). The CPU 10 counts elapsed time from the start of exposure and determines whether the flash timing T1 of the flash 60 has come (Step S81).

If it is determined that the flash timing T1 has come, the CPU 10 moves the focusing lens 24f to the in-focus position F1 (Step S82).

Incidentally, when the amount of camera shake is equal to or larger than the threshold, the focusing lens 24f, which is already located at the in-focus position F1, is not moved any more.

Once the focusing lens 24f is moved to the in-focus position, the CPU 10 fires the flash 60 (Step S83).

Subsequently, the CPU 10 finishes the exposure when a preset exposure time (shutter speed) is reached (Step S84), records the image obtained by photography on the memory card 46 (Step S85), and finishes the process.

In this way, according to the present embodiment, since exposure is started with the focusing lens 24f placed at the background's in-focus position F4 only when there is no camera shake, it is possible to effectively prevent an unnatural image with a blurred background due to camera shake.

Although according to the present embodiment, exposure is started with the focusing lens 24f placed at the in-focus position F1 when there is camera shake, initial position of the focusing lens 24f when there is camera shake is not limited to the in-focus position F1. Exposure may be started with the focusing lens 24f placed at a position set arbitrarily by the user or placed at a front-focus position.

Also, in the photographic methods according to the first and second embodiment, exposure may be started with the focusing lens 24f placed at a predetermined position only when there is no camera shake. However, when the background is blurred intentionally, even if there is camera shake, since the background itself is blurred, the photographed image itself is less likely to give an unnatural impression. Thus, the present method is especially useful when taking a photograph with both background and main subject placed in focus.

Although according to the present embodiment, the presence or absence of camera shake is detected based on the output from the shake detection sensor 70, since it can be assumed that there is no camera shake when a tripod is used, the presence or absence of camera shake may be detected by automatically detecting whether or not the photographic apparatus is mounted on a tripod.

When the photographic apparatus has a camera shake correction function and the function is ON, since photography can be taken without causing background blur even if camera shake occurs, exposure may be started with the focusing lens 24f placed at the background's in-focus position F4. Alternatively, exposure may be started with the focusing lens 24f placed at the in-focus position F1 only when correction limits are reached (by raising the threshold).

Also, although according to the present embodiment, camera shake is detected at the time when the shutter button is full-pressed, the timing of camera shake detection is not limited to this. For example, camera shake may be checked for when the shutter button is half-pressed or may be checked for constantly. Alternatively, camera shake may be checked for constantly and the detected amount of camera shake may be acquired just before the shutter button is full-pressed.

Also, although in the embodiments described above, the in-focus position is detected using the image pickup element 30, the in-focus position may be detected using a range sensor installed separately.

Also, although in the embodiments described above, the light quantity of the flash 60 is controlled through preflashing of the flash 60, the light quantity of the flash 60 may be controlled using a flash sensor installed separately (so-called flash control).

Preferably, by configuring a single photographic apparatus to be able to perform all the photographic methods according to the embodiments described above including a regular photographic method for slow synchro-flash photography (photographic method which conducts slow synchro-flash photography at the in-focus position from the start of exposure), the user is allowed to select which photographic method to use for synchro-flash photography. That is, it is preferable to allow the user to select among a mode (regular mode) in which the regular photographic method is used for slow synchro-flash photography, a mode (first mode) in which synchro-flash photography is taken by blurring the background freely as described in the first embodiment, a mode (second mode) in which synchro-flash photography is taken with a higher degree of background blur as described in the second embodiment, and a mode (third mode) in which synchro-flash photography is taken with both background and main subject placed in focus as described in the third embodiment.

Also, although in the embodiments described above, the present invention is applied to a digital camera, the present invention is not limited to this and can be similarly applied to so-called film cameras. Also, the present invention can be applied to camera phones and other equipment provided with a photography function.

What is claimed is:

1. A photographic method for slow synchro-flash photography conducted by firing a flash at a slow shutter speed, comprising the steps of:
    starting exposure with a focusing lens placed at an arbitrary position, and
    moving the focusing lens to such a position as to focus on a main subject, just before the flash is fired.

2. A photographic method for slow synchro-flash photography conducted by firing a flash at a slow shutter speed, comprising the steps of:
    starting exposure with a focusing lens placed at such a position as to front-focus on a main subject, and
    moving the focusing lens to such a position as to focus on the main subject, just before the flash is fired.

3. A photographic method for slow synchro-flash photography conducted by firing a flash at a slow shutter speed, comprising the steps of:
    starting exposure with a focusing lens placed at such a position as to focus on a background, and
    moving the focusing lens to such a position as to focus on a main subject, just before the flash is fired.

4. The photographic method according to claim 3, wherein an amount of camera shake is detected and only when the detected amount of camera shake is less than a threshold, exposure is started with the focusing lens placed at the position where the focusing lens will focus on a background.

5. A photographic apparatus which, being equipped with a taking lens including a focusing lens, a flash for use to emit flash light to a main subject, and an image pickup device for use to pick up an optical image of subjects formed on a light-receiving surface via the taking lens, conducts slow synchro-flash photography by firing the flash at a slow shutter speed, the photographic apparatus comprising:
    a lens moving device which moves the focusing lens;
    a detection device which detects a position where the focusing lens will focus on the main subject;
    an acquisition device which acquires information about a flash timing to fire the flash; and a control device which controls movement of the focusing lens based on detection results produced by the detection device and the information acquired by the acquisition device, during slow synchro-flash photography, wherein the control device moves the focusing lens to a predetermined position before start of exposure and moves the focusing lens to the position where the focusing lens will focus on the main subject, just before the flash is fired.

6. A photographic apparatus which, being equipped with a taking lens including a focusing lens, a flash for use to emit flash light to a main subject, and an image pickup device for use to pick up an optical image of subjects formed on a light-receiving surface via the taking lens, conducts slow synchro-flash photography by firing the flash at a slow shutter speed, the photographic apparatus comprising:

a lens moving device which moves the focusing lens;

a detection device which detects a position where the focusing lens will focus on the main subject;

an arithmetic device which calculates a position where the focusing lens will front-focus on the main subject, based on detection results produced by the detection device;

an acquisition device which acquires information about a flash timing to fire the flash; and a control device which controls movement of the focusing lens based on detection results produced by the detection device, computational results produced by the arithmetic device, and the information acquired by the acquisition device, during slow synchro-flash photography, wherein the control device moves the focusing lens to the position where the focusing lens will front-focus on the main subject before start of exposure and moves the focusing lens to the position where the focusing lens will focus on the main subject, just before the flash is fired.

7. A photographic apparatus which, being equipped with a taking lens including a focusing lens, a flash for use to emit flash light to a main subject, and an image pickup device for use to pick up an optical image of subjects formed on a light-receiving surface via the taking lens, conducts slow synchro-flash photography by firing the flash at a slow shutter speed, the photographic apparatus comprising:

a lens moving device which moves the focusing lens;

a detection device which detects a position where the focusing lens will focus on the main subject and a position where the focusing lens will focus on a background;

an acquisition device which acquires information about a flash timing to fire the flash; and a control device which controls movement of the focusing lens based on detection results produced by the detection device and the information acquired by the acquisition device, during slow synchro-flash photography, wherein the control device moves the focusing lens to the position where the focusing lens will focus on the background before start of exposure and moves the focusing lens to the position where the focusing lens will focus on the main subject, just before the flash is fired.

8. The photographic apparatus according to claim 7, further comprising: an amount-of-camera-shake detection device which detects an amount of camera shake, wherein only when the detected amount of camera shake by the amount-of-camera-shake detection device is less than a threshold, the control device moves the focusing lens to the position where the focusing lens will focus on the background before start of exposure.

* * * * *